United States Patent
Brown

[11] Patent Number: 6,019,337
[45] Date of Patent: Feb. 1, 2000

[54] LOCKABLE STAND FOR TRAILERS

[76] Inventor: Roland Brown, 12036 Bertha St., Cerritos, Calif. 90703

[21] Appl. No.: 09/108,951

[22] Filed: Jun. 30, 1998

[51] Int. Cl.[7] .................................................. A47F 5/00
[52] U.S. Cl. .................. 248/354.5; 248/352; 280/507; 70/62
[58] Field of Search ........................ 248/177.1, 181.1, 248/181.2, 351, 352, 511, 354.1, 354.5, 357; 280/1, 507, 511

[56] References Cited

U.S. PATENT DOCUMENTS

| | | | |
|---|---|---|---|
| 2,439,854 | 4/1948 | Lipski | 248/352 |
| 3,857,575 | 12/1974 | Lee | 280/1 |
| 3,870,268 | 3/1975 | Larkin | 248/354 |
| 3,884,055 | 5/1975 | Vuillemot | 70/58 |
| 4,042,202 | 8/1977 | Molinari | 248/352 |
| 4,459,832 | 7/1984 | Avrea et al. | 70/14 |
| 4,548,418 | 10/1985 | Wendorff | 280/1 |
| 4,577,884 | 3/1986 | Harris | 280/507 |
| 4,756,172 | 7/1988 | Weaver | 70/58 |
| 4,836,570 | 6/1989 | Lopez et al. | 280/507 |
| 5,520,360 | 5/1996 | Wensman | 248/354.5 |
| 5,584,495 | 12/1996 | Mason | 280/507 |
| 5,700,024 | 12/1997 | Upchurch | 280/507 |
| 5,794,961 | 8/1998 | Niswanger | 280/507 |

*Primary Examiner*—Derek J. Berger
*Assistant Examiner*—Michael Nornberg
*Attorney, Agent, or Firm*—Steins & Associates

[57] ABSTRACT

A Lockable Stand for Trailers is disclosed. The preferred stand comprises an upwardly-extending pedestal assembly terminating in a head assembly that is configured to lockably attach to a trailer tongue. The preferred head assembly will further include a detachable ball for accepting the trailer tongue and a pair of vertical side brackets through which a removable tongue lock extends to prevent the tongue from being removed from the ball. The stand is very compact for convenience, while also being stable to prevent trailer rollaway. In another preferred form, the pedestal assembly is height-adjustable to accommodate a variety of trailer styles and designs. The pedestal assembly might also be made from two telescoping pieces that can further be disassembled for storage or transport.

14 Claims, 7 Drawing Sheets

LOCKABLE STAND FOR TRAILERS

BACKGROUND OF THE INVENTION

1. Field of the Invention

This invention relates generally to accessories for Vehicle Trailers and, more specifically, to a Lockable Stand for Trailers.

2. Description of Related Art

Outdoor activities have begun very popular in recent years, particularly when the activity involves the use of a water, dirt, sand or other craft, as well as camper-type trailers. Many of these craft are portable (i.e. over land), such that they can be transported to and from a variety of locations. This transporting is typically accomplished through use of a trailer of some sort, the trailer being attachable to the user's vehicle's towing rig. In most cases, the trailer is not only used for transport of the craft, but also to store the craft when it is not in use, such as when the craft and trailer are parked at the user's home.

Figure 1:
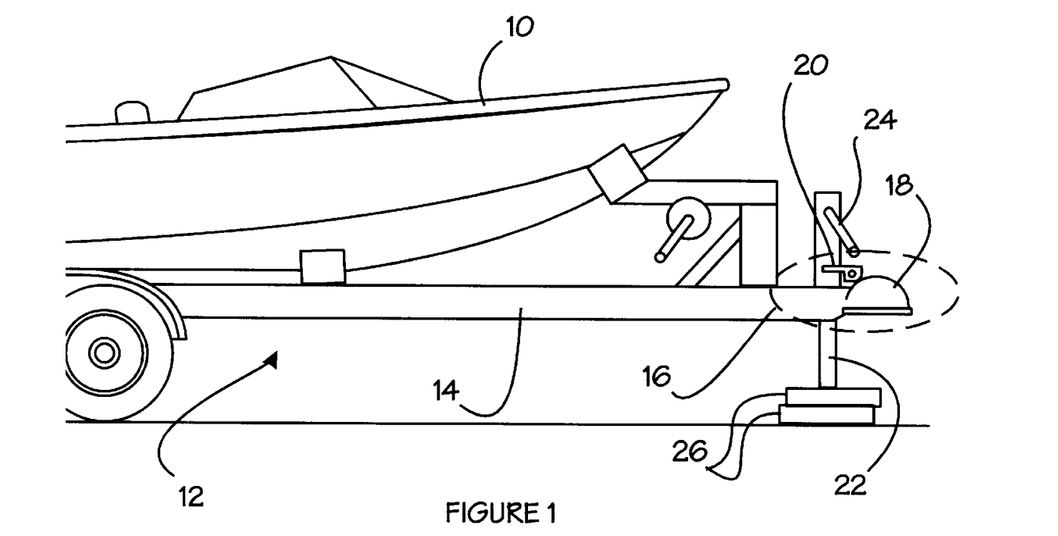
FIG. 1 is a side view of a conventional boat trailer standing on a stack of wood blocks.

Turning to FIG. 1, we might discuss two serious problems that arise when the trailer is parked, such as between uses. FIG. 1 is a side view of a convention boat 10 and trailer 12 in a storage situation. The trailer 12 includes a frame 14 which terminates at it's front end in a tongue 16. The tongue 16, in it's pertinent part includes a socket 18 that is designed to fit over a tow ball (not shown) attached to the vehicle's tow rig. Once engaged to the tow ball (not shown), the socket 18 is typically retained in place (at least marginally) by the ball latch 20. When the trailer 12 is being stored, it is driven to the desired location, after which the user lowers the tongue jack 22 by operating the tongue jack crank 24 until the socket 18 is lifted off of the tow ball (not shown). Most times, the tongue jack 22 cannot extend low enough to adequately lift the socket 18 off of the tow ball (not shown); in these situations, it is common for the user to create a pile of wood blocks 26 to create more vertical height for the tongue jack 22. The user typically then leaves the trailer 12 as is, sitting on the wood or cement blocks 26 until the next use.

There are two serious problems with the "blocks" method of trailer storage. First, the blocks 26, particularly if wood, can be unstable, particularly after prolonged use and exposure to the elements. Also, the blocks 26, if made from cement, may be too large to transport along with the trailer—when the user arrives at the destination, he or she must then dig around the area to find suitable blocks 26 upon which the tongue jack 22 may sit. Neither of these situations is safe, particularly when you consider that it is common for the user to crawl around the craft 10 (on the trailer 12) for cleaning and repairs. What is needed is a portable, stable and compact stand upon which the tongue 16 can rest while a trailer 12 is in storage.

Second, the "blocks" system does not provide the user with any way of protecting the trailer 12 from theft. Essentially, anyone with the properly sized tow ball (not shown) can back up their vehicle, hook up the trailer 12, and then drive away with an expensive boat 10 or other craft. It would be very beneficial if the stand had the ability to lock the trailer in place in order to deter theft.

Figure 2:
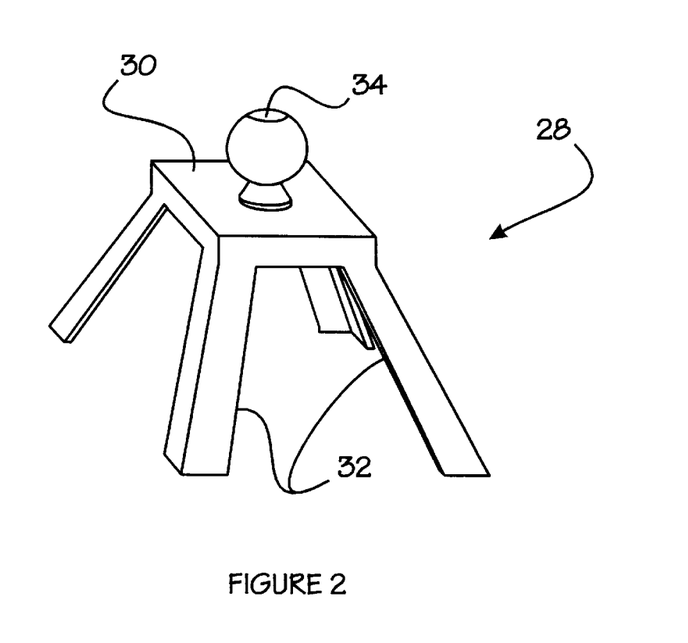
FIG. 2 is a perspective view of a prior trailer stand.

FIG. 2 depicts a prior trailer stand 28 that sought to solve these problems. While the prior stand 28 did provide some safety benefits. The prior stand 28 comprised a base 30 supported by four legs 32, typically constructed from angle steel or iron. A tow ball 34, identical to the type installed on a vehicle's tow rig extended upward from the base 30, and configured to accept the socket (see FIG. 1) thereon. In use, then, the user would first jack the tongue off of the vehicle's tow ball; the user would then lower the socket onto the ball 34 attached to the prior trailer stand 28.

While the prior trailer stand 28 did add substantial stability over the wood or cement blocks, it has other problems: (1) it is not height-adjustable, (2) it is heavy and bulky, (3) it is not collapsible, and (4) it does not include a means for locking the tongue to the stand 28. What is needed is a trailer stand that has all of these features; it should be stable, lightweight, height-adjustable, collapsible, and it should provide an easy means for preventing thieves from taking the trailer.

SUMMARY OF THE INVENTION

In light of the aforementioned problems associated with the prior devices, it is an object of the present invention to provide a Lockable Stand for Trailers. It is a further object that the stand comprise an upwardly-extending pedestal assembly terminating in a head assembly that is configured to lockably attach to a trailer tongue. The preferred head assembly will include a ball for accepting the trailer tongue and a pair of vertical side brackets through which a removable tongue lock extends to prevent the tongue from being removed from the ball. The stand should be very compact for convenience, while also being stable to prevent trailer roll-away. In another preferred form, the pedestal assembly should be height-adjustable to accommodate a variety of trailer styles and designs. The pedestal assembly might also be made from two telescoping pieces that can further be disassembled for storage or transport. It is a further object that the ball be detachable.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a Lockable Stand for Trailers.

Figure 3:
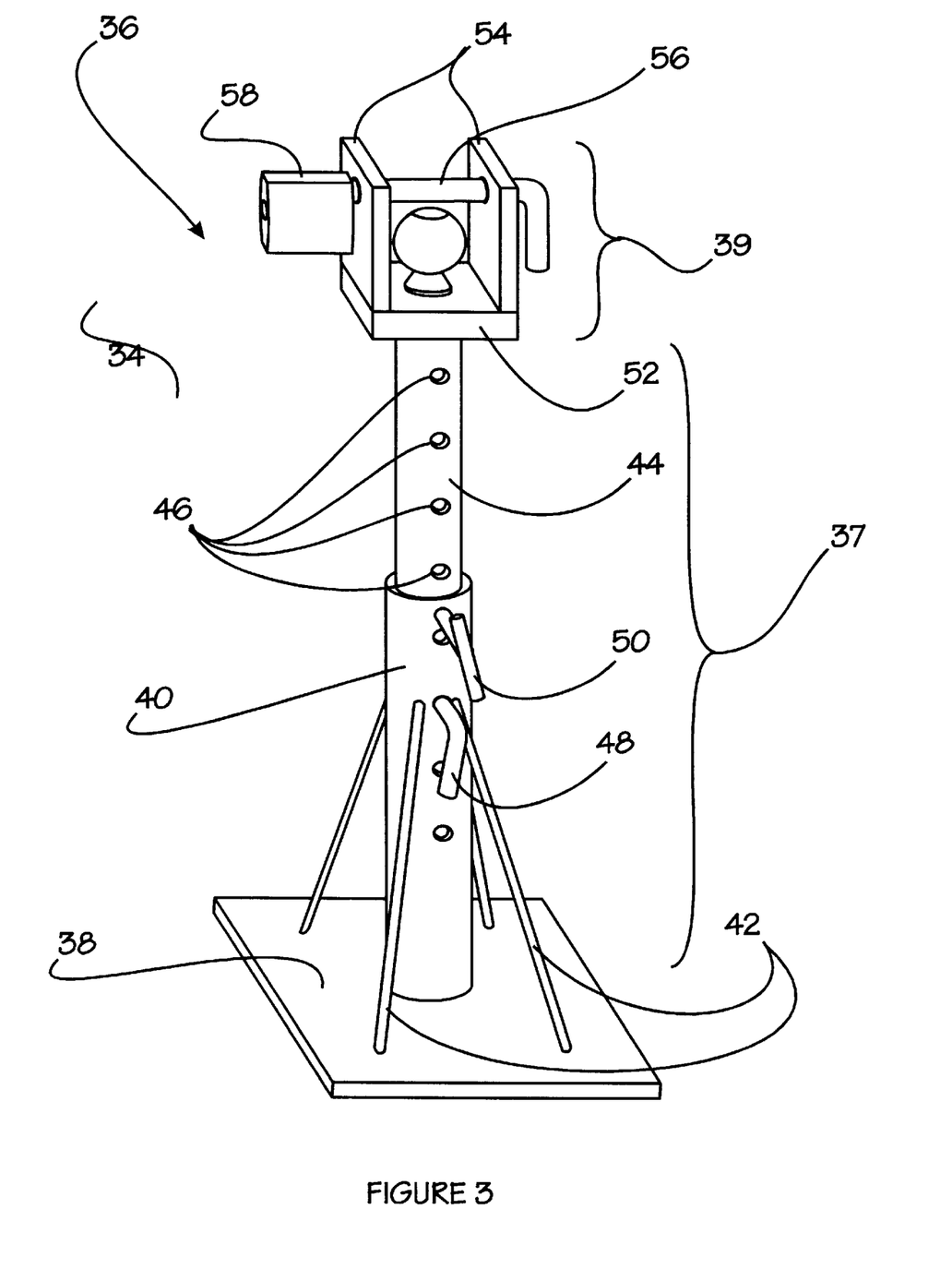
FIG. 3 is a perspective view of a preferred embodiment of the lockable trailer stand of the present invention.

The present invention can best be understood by initial consideration of FIG. 3. FIG. 3 is a perspective view of a preferred embodiment of the lockable trailer stand 36 of the present invention. As shown, the stand 36 comprises a pedestal assembly 37 and a head assembly 39. Generally speaking, the pedestal assembly 37 supports the head assembly 39; the pedestal assembly 37 may provide adjustability to its height (as shown), or it may define a single fixed height. The head assembly 39 is generally designed to attach, and lock to, the tongue of a trailer; designs other than that specifically shown for the pedestal assembly 37 and head assembly 39 may be used, depending upon the particular application involved. In the present embodiment, the pedestal assembly 37 comprises a platform member 38, which is a flat piece of metal or other rigid, durable material in rectangular or other preferred shape, as desired. Extending upwardly from the platform member 38 is a lower post 40. The lower post 40 is preferably a hollow tube, such as from metal having a circular cross-section. Other materials and cross-sections may be used. The lower post 40 is attached to the platform member 38 and further may include a plurality of struts 42 to increase the device's stability and durability. Here, four struts 42 are used; other designs may have more or fewer struts, as necessary.

Further defining the pedestal assembly 37 (in a height-adjustable embodiment) is the upper post 44, which is configured to slide within the lower post 40 until the desired height is achieved. In other designs, the lower post 40 may actually slide inside of the upper post 44. In any event, both the upper and lower posts include apertures 46 along their lengths; each aperture located such that the upper post apertures 46 match up with the lower post apertures 46. There is an identical set of apertures 46 on the back side of each post. When the appropriate height is set, the pin 48 is slipped through the apertures 46 in both the front and back side of the upper and lower posts 44 and 40, to fix the height of the pedestal assembly 37. To extend, collapse or disassemble the pedestal assembly 37, one need merely remove the pin 48. Also provided within the pedestal assembly 37 may be a post clamp 50. The post clamp 50, in the present form, is essentially a threaded bolt having a "T" handle. The pedestal assembly 37 will acquire increased stability by tightening the post clamp 50 (into a threaded aperture in the lower post 40) until the upper post 44 is tightly clamped. Other conventional clamps may be employed, such as clips, straps, sleeves and others.

In its preferred form, the head assembly 39 comprises a base plate 52 and a pair of side brackets 54 extending upwardly therefrom; each of these parts is preferably made from steel, iron or other durable, rigid material. A removable ball 34 is attachable to the center area of the base plate 52 in order to provide a location to which the socket (see FIG. 1) may attach. The ball 39 may be of the identical type as will fit the vehicle's tow rig, and as such, may be interchangeable with it.

A tongue lock shaft 56 extends through coaxial apertures formed in the side brackets 54. As is shown below in connection with FIGS. 7 and 8, once the socket (see FIG. 1) is in place on the ball 34, the tongue lock shaft 56 is slid into place and locked there by a tongue lock 58. The tongue lock 58 functionality may be accomplished by many different systems that are well known; the example shown is one in which the tongue lock 58 is essentially a padlock—the tongue lock shaft 56 simply takes the place of the padlock's bow-shaped piece. The design shown is particularly useful, since it is compact and reliable.

Figure 4:
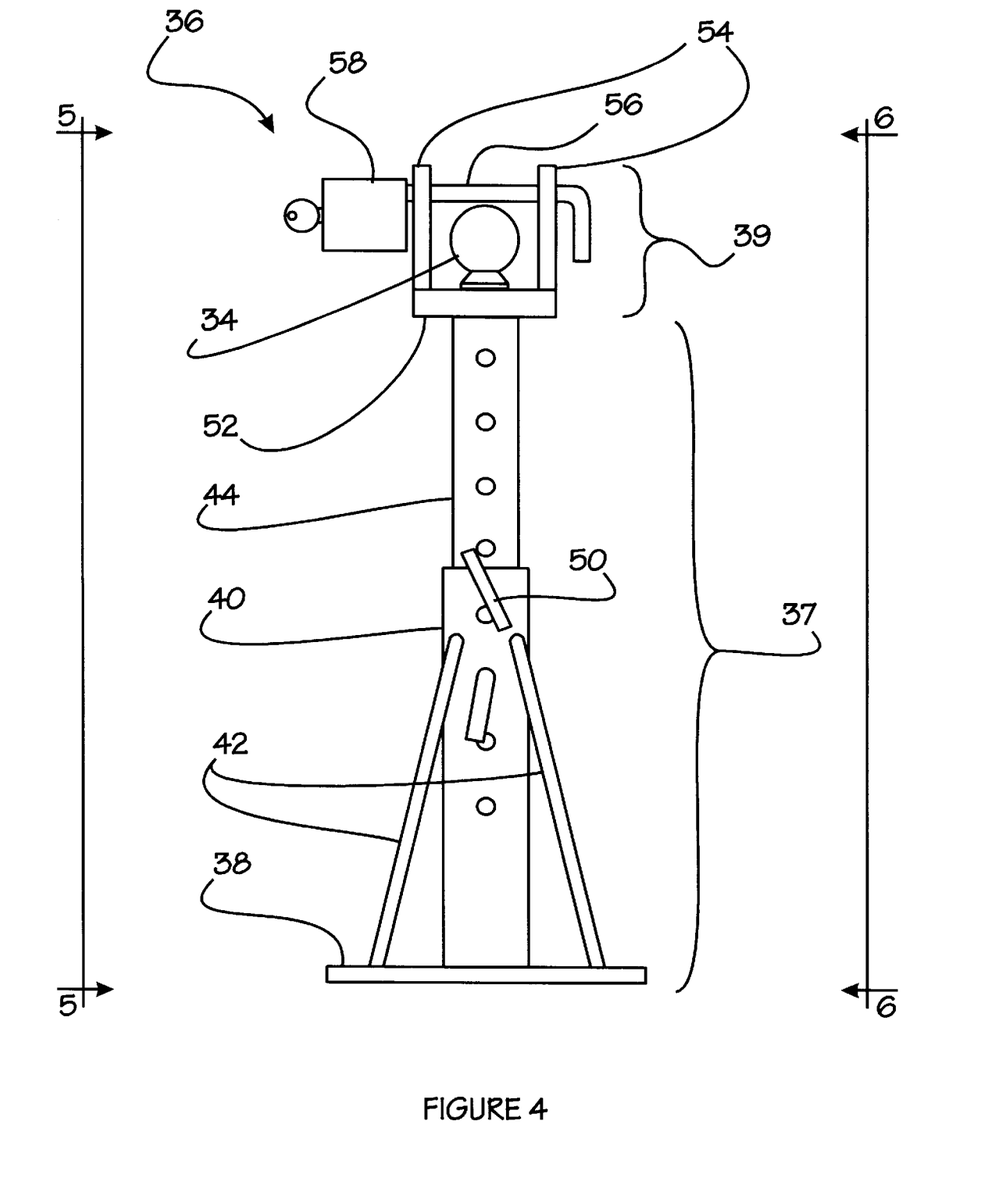
FIG. 4 is a front view of the trailer stand of FIG. 3.

Another perspective of the novel device of the present invention is given in FIG. 4. FIG. 4 is a front view of the trailer stand 36 of FIG. 3. As can be seen, the side brackets 54 and base plate 52 define a sort of compartment within which the socket (see FIG. 1) can be held once the tongue lock 58 and shaft 56 are in place. The stand 36 may be constructed of iron, steel, high impact plastic or other composite product, depending upon the situation. Furthermore, it might be desirable that the stand 36 float (i.e. have positive buoyancy in water).

Figures 5, 6:
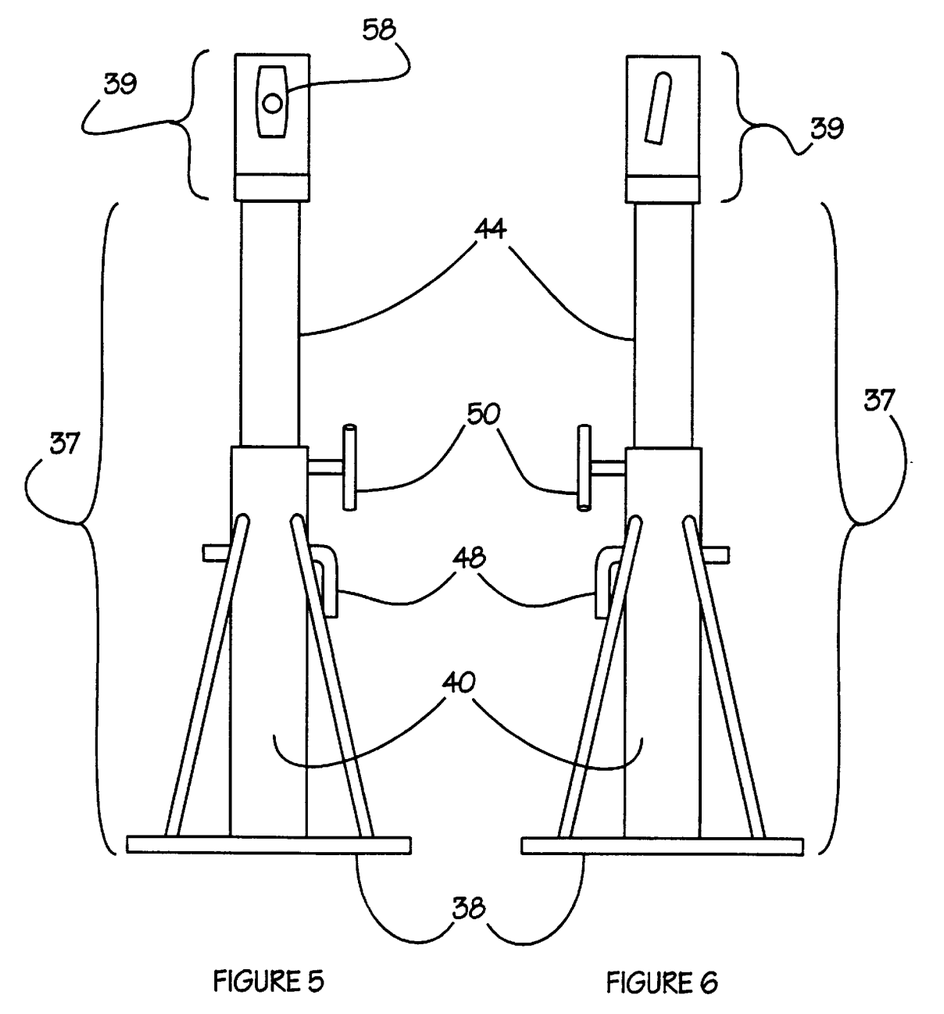
FIG. 5 is a side view of the trailer stand of FIGS. 3 and 4.
FIG. 6 is another side view of the trailer stand of FIGS. 3–5.

FIGS. 5 and 6 give additional detail regarding the present invention; they are opposite side views of the stand 36 of FIGS. 3 and 4. Of particular interest in these drawings are the pin 48 and post clamp 50. As can be seen, the pin 48 is essentially a "L"-shaped bar of metal that is slipped through the apertures of the upper and lower posts 44 and 40 to hold the upper post 44 in position. The post clamp 50 is a "T"-shaped handle that has a threaded end for screwing into a threaded aperture within the lower post 40. The post clamp 50 is turned in until it creates a solid interference fit with the upper post 44. Similarly, the tongue lock shaft 56 is an "L"-shaped bar that is easily handled, inexpensive to manufacture, and virtually tamper- and wear-proof.

Figure 7A:
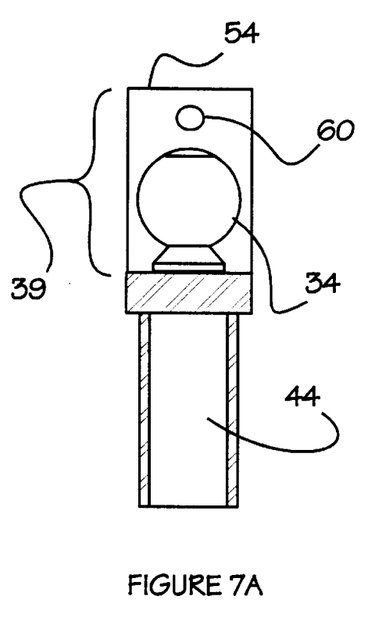
FIGS. 7A and 7B are partial cutaway side views of the head assembly of the trailer stand of FIGS. 3–6 depicting the operation of the trailer tongue and the head assembly.
Figure 7B:
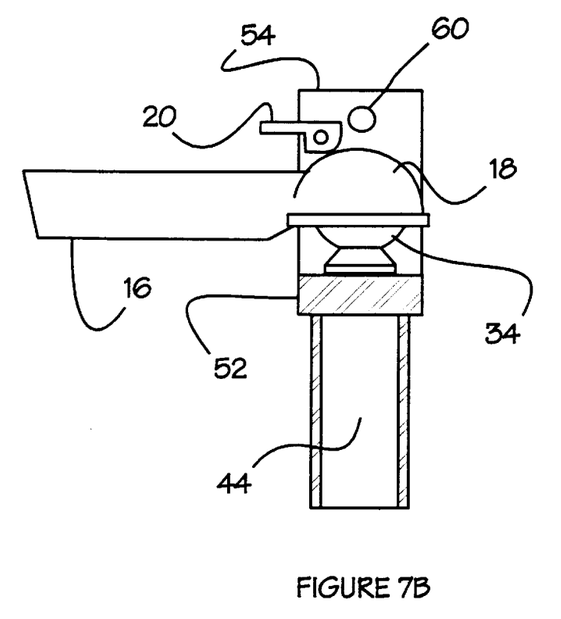
Figure 8:
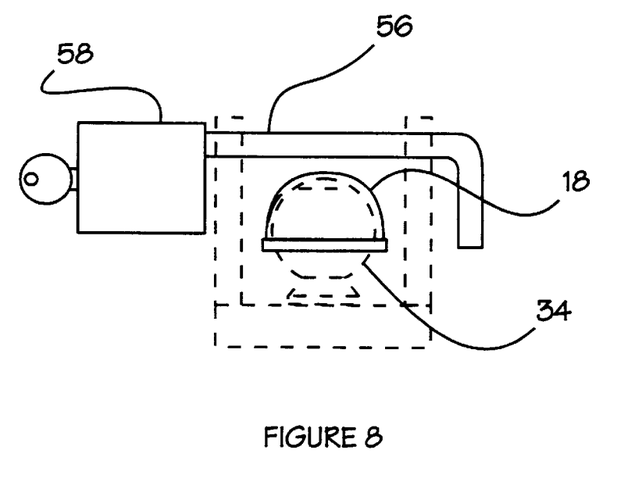
FIG. 8 is another partial cutaway side view of the head assembly of the trailer stand of FIGS. 3–7 depicting the installation of the tongue lock.

Now turning to FIGS. 7 and 8, we can see how the socket 18 is locked into the ball 34 of the stand of FIGS. 3–6. FIGS. 7A and 7B are partial cutaway side views of the head assembly 39 of the trailer stand of FIGS. 3–6 depicting the operation of the trailer tongue and the head assembly, and FIG. 8 is another partial cutaway side view of the head assembly 39 of the trailer stand of FIGS. 3–7 depicting the installation of the tongue lock shaft 56 through the shaft apertures 60 and into the tongue lock 58 once the socket 18 has been attached to the stand.

Figure 9:
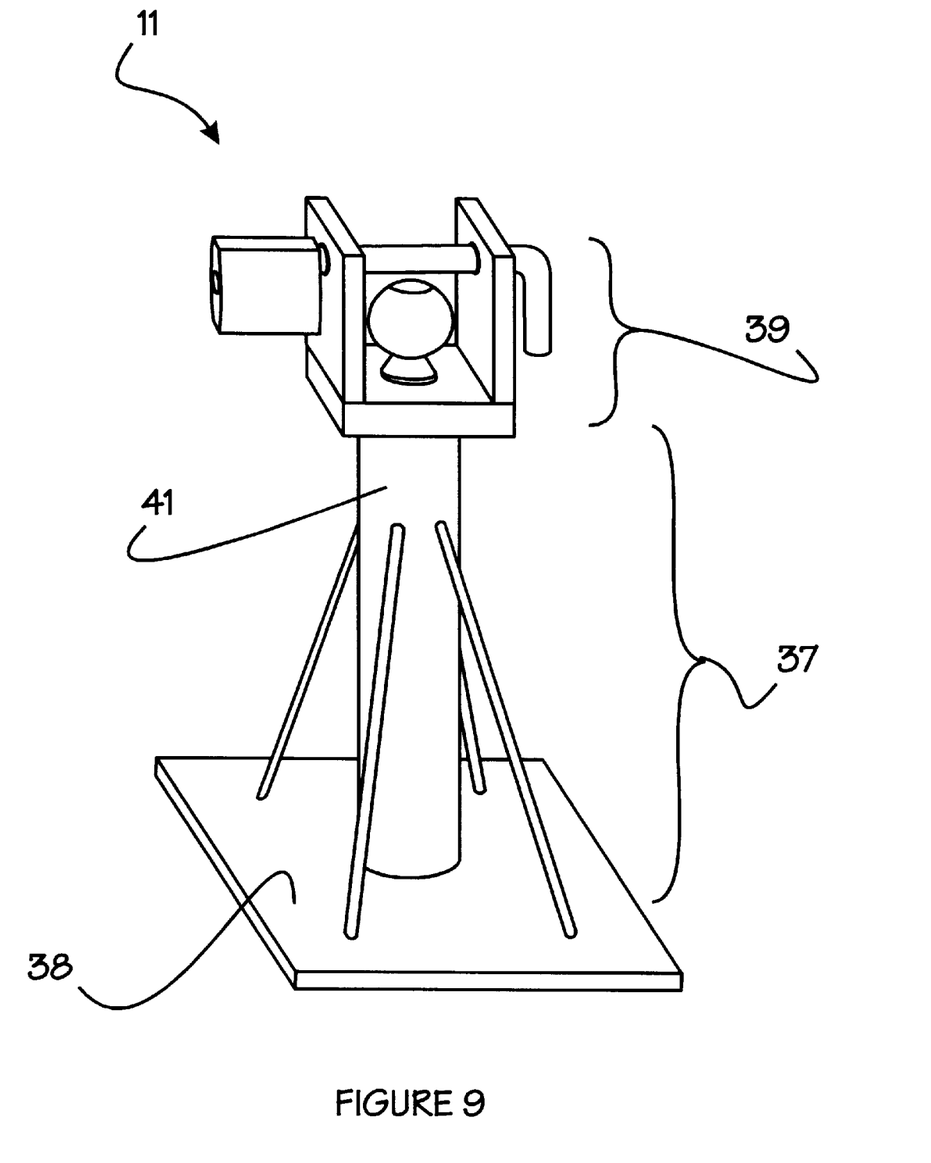
FIG. 9 is a perspective view of a non-height-adjustable trailer stand of the present invention.
Figure 10:
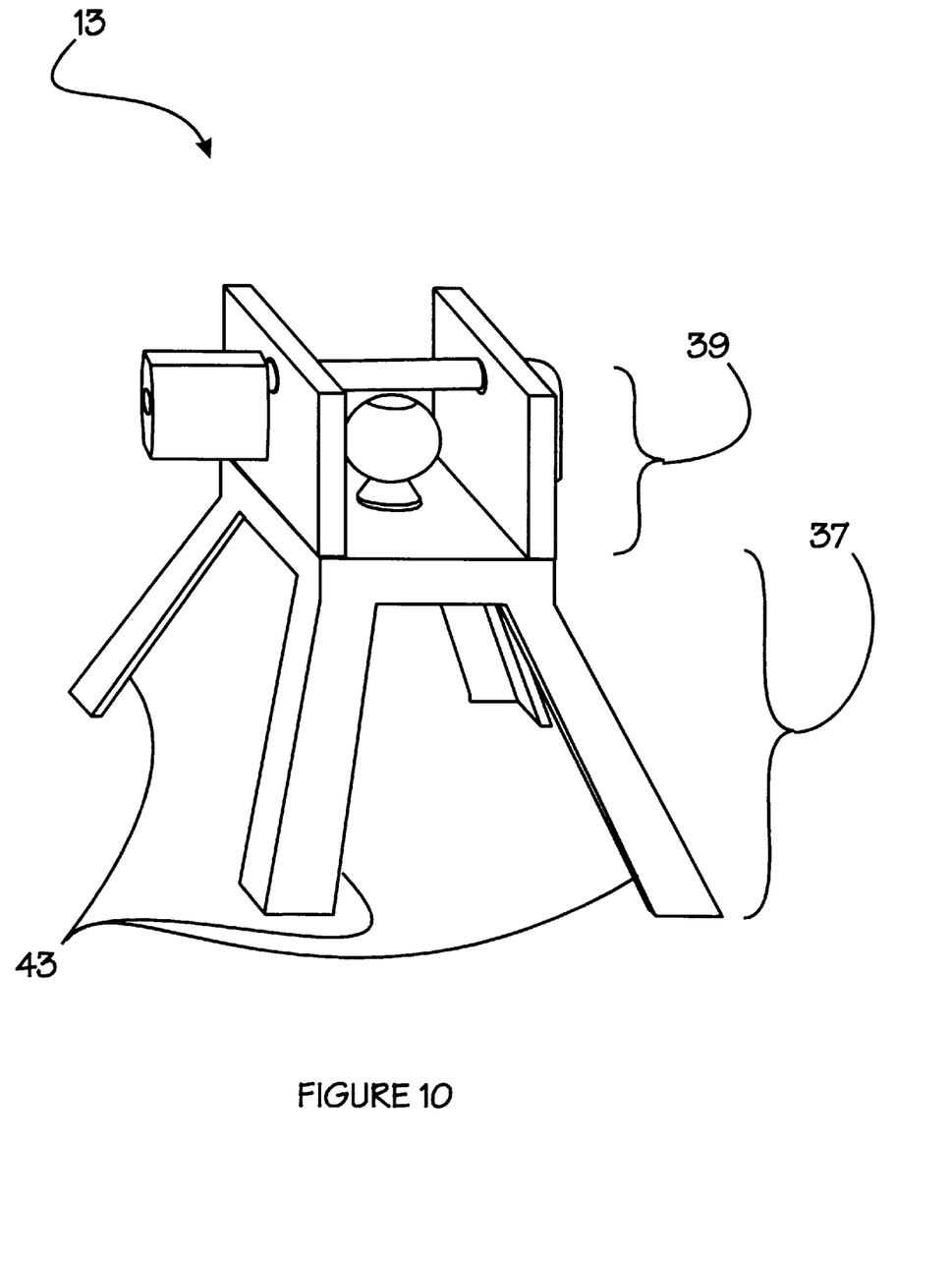
FIG. 10 is a perspective view of another embodiment of a non-height-adjustable trailer stand of the present invention.

FIGS. 9 and 10 depict yet more examples of the trailer stand of the present invention. FIG. 9 is a perspective view of a non-height-adjustable trailer stand 11 of the present invention. As can be seen, this stand 11 comprises a lockable head assembly 39 atop a pedestal assembly 39. In this version, however, the alternate lower post 41 takes the place of the upper and lower post of the previously-described embodiment. The alternate lower post 41 (which will not telescope) extends upward from the platform member 38.

FIG. 10 depicts yet another embodiment of a non-height-adjustable trailer stand 13. In this embodiment, the head assembly 39 is integral to the pedestal assembly 37. Furthermore, the pedestal assembly 37 comprises a plurality of alternate struts 43 (in place of the upper and lower posts). The benefit of this design is that it is extremely stable and low-cost to manufacture, and it also may be stackable.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A lockable portable stand for trailers, said trailers defined by a tongue, comprising:

a pedestal assembly extending upwardly, and resting moveably upon the ground; and a head assembly, comprising a base plate having opposing edges, a ball configured to accept said tongue, a pair of vertical side brackets, each said side bracket extending upwardly from one said opposing edge of said base plate, and a tongue lock assembly consisting of a lock having a shaft-receiving barrel, said barrel having a lockable pathway for engaging a shaft, and a single shaft extending between said vertical side brackets and into said shaft-receiving barrel of said lock, said head assembly extending upwardly from said pedestal assembly, said head assembly configured to lockably accept said tongue.

2. The stand of claim 1, wherein said pedestal assembly comprises:

an upper post attached to said base plate; and a platform member attached to said upper post, said platform member configured to cause said stand to remain upright and stable.

3. The stand of claim 2, wherein said pedestal assembly further comprises a lower post extending upwardly from said platform member and further defined by a hollow core configured to slidingly accept said upper post therein.

4. The stand of claim 3 further comprising a plurality of struts extending from said platform member to said lower post at substantially regular intervals around said lower post.

5. The stand of claim 4 wherein:

said lower post is further defined by a longitudinal line of lower post apertures;

said upper post is further defined by a longitudinal line of upper post apertures; and said stand further comprises a pin, said pin being insertible through one said lower post aperture and one said upper post aperture to fix the longitudinal position of said upper post relative to said lower post.

6. The stand of claim 5, further comprising a post clamp for further restraining said upper post relative to said lower post.

7. The stand of claim 6 further comprising a detachable ball.

8. The stand of claim 7, wherein said upper post is detachable from said lower post.

9. A device for preventing the theft of a trailer, said trailer defined by a tongue and socket, said socket adapted to accept a tow ball, said device comprising:

a pedestal assembly for resting moveably on the ground; and a head assembly defined by a tow ball for accepting said socket thereon, said head assembly further comprising:

a base plate having a top surface and two opposing edges;

a pair of substantially vertical side brackets extending upwardly from said opposing edges, each said side bracket further defined by a shaft aperture, said apertures aligned along a shaft axis; and a tongue lock assembly, consisting of a lock having a shaft-receiving barrel, said barrel having a lockable pathway for engaging a shaft; and a tongue lock shaft insertible through said shaft apertures and into said shaft-receiving barrel, whereafter said tongue lock shaft is not extractable from said shaft apertures or said shaft-receiving aperture in said lock.

10. The device of claim 9, wherein said pedestal assembly further comprises a plurality of struts extending upwardly from a substantially flat platform member, said platform member configured to rest on the ground.

11. The device of claim 10, wherein said pedestal assembly is further defined by a post assembly extending from said platform member to said head assembly.

12. The device of claim 11, wherein said post assembly defines a length which is adjustable.

13. The device of claim 12, wherein said post assembly comprises a telescoping arrangement between an upper post and a lower post.

14. The device of claim 13, wherein said upper post and said lower post each further include upper and lower post apertures, respectively, whereby one said upper post is telescopically adjustable relative to said lower post until a said upper post aperture is aligned to a said lower post aperture whereby a pin in insertable therethrough.

* * * * *